United States Patent
Jeon et al.

(10) Patent No.: US 10,005,452 B2
(45) Date of Patent: Jun. 26, 2018

(54) APPARATUS AND METHOD FOR CONTROLLING HYBRID ELECTRIC VEHICLE INCLUDING DUAL CLUTCH TRANSMISSION

(71) Applicants: HYUNDAI MOTOR COMPANY, Seoul (KR); KIA MOTORS CORPORATION, Seoul (KR)

(72) Inventors: Byeong Wook Jeon, Seoul (KR); Ju Hyun Nam, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 312 days.

(21) Appl. No.: 15/131,575

(22) Filed: Apr. 18, 2016

(65) Prior Publication Data

US 2017/0166192 A1    Jun. 15, 2017

(30) Foreign Application Priority Data

Dec. 10, 2015 (KR) ........................ 10-2015-0176140

(51) Int. Cl.
| | |
|---|---|
| *B60W 10/02* | (2006.01) |
| *B60W 10/113* | (2012.01) |
| *B60W 20/30* | (2016.01) |
| *B60W 20/40* | (2016.01) |
| *B60K 6/36* | (2007.10) |

(Continued)

(52) U.S. Cl.
CPC ............... *B60W 20/30* (2013.01); *B60K 6/36* (2013.01); *B60K 6/387* (2013.01); *B60K 6/48* (2013.01); *B60K 6/547* (2013.01); *B60W 10/02* (2013.01); *B60W 10/113* (2013.01); *B60K 2006/4825* (2013.01); *B60W 20/00* (2013.01); *B60W 20/40* (2013.01); *B60W 2510/0241* (2013.01); *B60W 2510/0638* (2013.01); *B60W 2510/081* (2013.01); *B60W 2510/1005* (2013.01); *B60W 2520/10* (2013.01); *B60W 2540/10* (2013.01); *B60W 2540/103* (2013.01); *B60W 2710/021* (2013.01); *B60W 2710/1005* (2013.01); *B60Y 2200/92* (2013.01); *B60Y 2300/421* (2013.01);

(Continued)

(58) Field of Classification Search
None
See application file for complete search history.

(56) References Cited

FOREIGN PATENT DOCUMENTS

| | | |
|---|---|---|
| JP | 4969386 | 7/2012 |
| JP | 5496056 | 5/2014 |

(Continued)

*Primary Examiner* — Jacob S. Scott
(74) *Attorney, Agent, or Firm* — Brinks Gilson & Lione

(57) ABSTRACT

A method and an apparatus for controlling a hybrid electric vehicle including a dual clutch transmission are provided. The method for controlling a hybrid electric vehicle including a dual clutch transmission may include: determining whether an engine start condition is satisfied in a state in which an engine is stopped; determining whether a kick-down shift condition is satisfied when the engine start condition is satisfied; connecting a speed gear corresponding to a target gear stage to an output shaft corresponding to the target gear stage when the kick-down shift condition is satisfied; determining whether a lock-up condition of an engine clutch is satisfied when the engine start condition is satisfied; locking up the engine clutch when the lock-up condition of the engine clutch is satisfied; and locking up a shift clutch corresponding to the target gear stage when the engine clutch is locked up.

10 Claims, 3 Drawing Sheets

(51) Int. Cl.
  *B60K 6/387* (2007.10)
  *B60K 6/48* (2007.10)
  *B60K 6/547* (2007.10)
  *B60W 20/00* (2016.01)

(52) U.S. Cl.
  CPC ........ *Y02T 10/6221* (2013.01); *Y02T 10/6252* (2013.01); *Y10S 903/93* (2013.01)

(56) References Cited

FOREIGN PATENT DOCUMENTS

| | | |
|---|---|---|
| JP | 2015-214312 A | 12/2015 |
| KR | 10-2012-0077735 | 7/2012 |
| KR | 10-2014-0134405 A | 11/2014 |
| KR | 10-1500374 B1 | 3/2015 |
| KR | 10-1543005 B1 | 8/2015 |

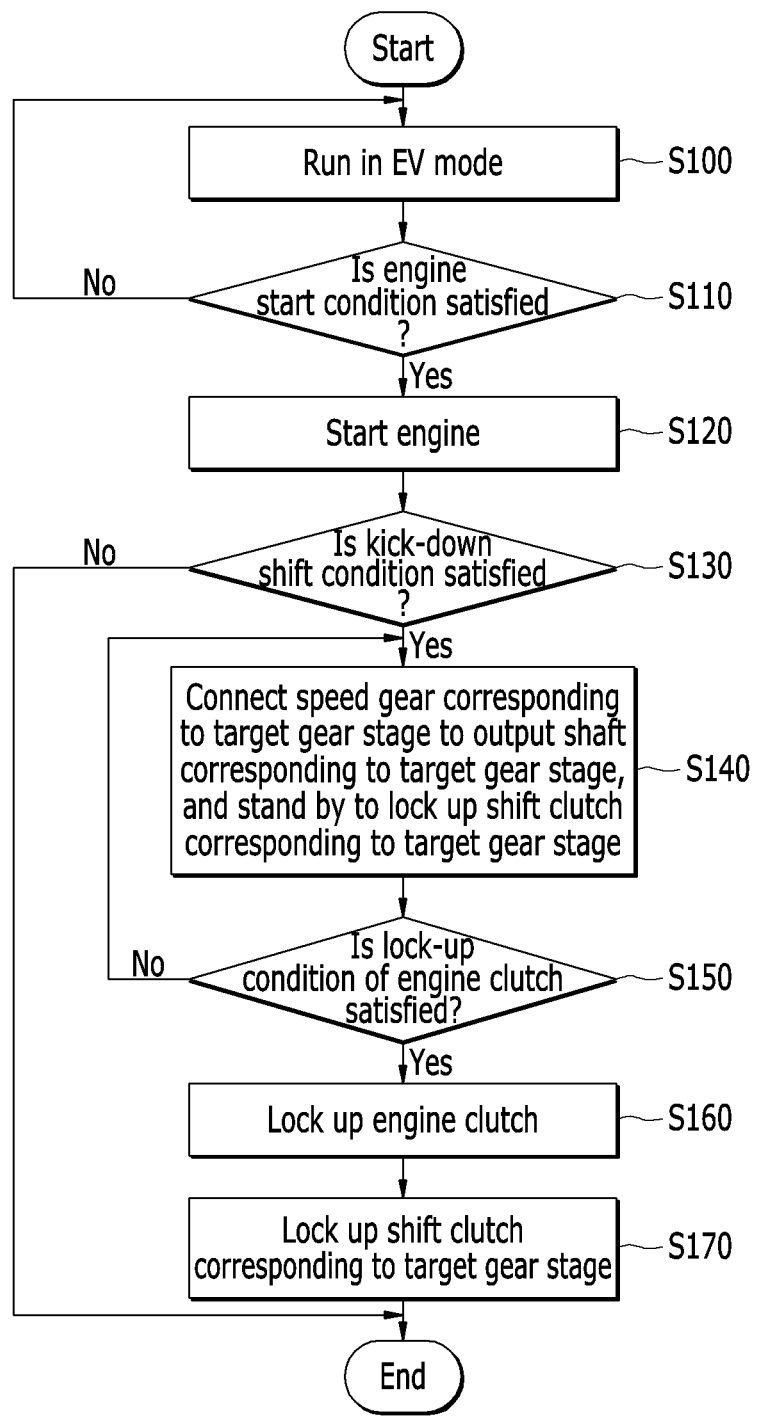

APPARATUS AND METHOD FOR CONTROLLING HYBRID ELECTRIC VEHICLE INCLUDING DUAL CLUTCH TRANSMISSION

CROSS-REFERENCE TO RELATED APPLICATION

This application claims priority to and the benefit of Korean Patent Application No. 10-2015-0176140, filed Dec. 10, 2015, which is incorporated herein by reference in its entirety.

FIELD

The present disclosure relates to an apparatus and a method for controlling a hybrid electric vehicle.

BACKGROUND

The statements in this section merely provide background information related to the present disclosure and may not constitute prior art.

Environmentally-friendly techniques of vehicle are important and the survival of future motor industry is dependent thereon. Vehicle makers are focusing on development of environmentally-friendly vehicles so as to meet environmental and fuel consumption regulations.

Some examples of application of such future vehicle techniques are a hybrid electric vehicle (HEV) and a dual clutch transmission (DCT).

The hybrid electric vehicle uses an internal combustion engine and a battery power source together. In other words, the hybrid electric vehicle efficiently combines and uses torque of the internal combustion engine and torque of a driving motor. Since the hybrid electric vehicle uses both mechanical energy of the engine and electrical energy of the battery, desired operation regions of the engine and the motor may be used, and energy upon braking may be recovered, such that fuel efficiency may be improved and the energy may be efficiently used.

The hybrid electric vehicle provides driving in an electric vehicle (EV) mode in which only torque of the driving motor is used; a hybrid electric vehicle (HEV) mode in which torque of the engine is used as main torque and torque of the driving motor is used as auxiliary torque; and a regenerative braking mode in which braking and inertial energy are recovered through electrical power generation of the driving motor during braking of the vehicle or during deceleration of the vehicle by inertia to be charged in the battery.

The DCT includes two clutches and a gear train applied to a manual transmission. The DCT selectively transmits torque output from a torque source (e.g., engine or driving motor) to two input shafts by using two clutches, changes a speed by using the gear train, and outputs the changed torque.

Such a DCT is used to realize a compact transmission having five or more forward speed stages. Since two clutches and synchronizers are controlled by a controller, a manual shift maneuver may be unnecessary for controlling the DCT. Therefore, the DCT is one type of automated manual transmission (AMT).

In the case of an automated transmission including a planetary gear train, shifting is achieved by operation of friction elements (clutches and brakes).

In contrast, in the case of the DCT, the shifting is achieved by operation of a shift clutch corresponding to a target gear stage after a speed gear corresponding to the target gear stage is connected to an output shaft corresponding to the target gear stage. Therefore, a speed gear corresponding to a next gear stage is connected to an output shaft corresponding to the next gear stage in advance so as to secure shift responsiveness, which is called a pre-selection (or pre-engagement). However, we have discovered that since rotation shaft of the DCT is restricted when the pre-selection is performed, power delivery performance and fuel efficiency are deteriorated due to a drag loss. In other words, since the shift responsiveness and the fuel efficiency are in a trade-off relationship, it is difficult to achieve both of them.

SUMMARY

The present disclosure provides a method and an apparatus for controlling a hybrid electric vehicle having advantages of improving shift responsiveness and fuel efficiency by connecting a speed gear corresponding to a target gear stage of a dual clutch transmission (DCT) to an output shaft corresponding to the target gear stage while a state of an engine clutch is changed from a release state to a lock-up state when an engine start condition and a kick-down shift condition are satisfied.

A method for controlling a hybrid electric vehicle including a dual clutch transmission may include: determining whether an engine start condition is satisfied in a state in which an engine is stopped; determining whether a kick-down shift condition is satisfied when the engine start condition is satisfied; connecting a speed gear corresponding to a target gear stage to an output shaft corresponding to the target gear stage when the kick-down shift condition is satisfied; determining whether a lock-up condition of an engine clutch is satisfied when the engine start condition is satisfied; locking up the engine clutch when the lock-up condition of the engine clutch is satisfied; and locking up a shift clutch corresponding to the target gear stage when the engine clutch is locked up.

Whether the kick-down shift condition is satisfied may be determined based on a position value of an accelerator pedal, a speed of the hybrid electric vehicle, and a current gear stage.

The lock-up condition of the engine clutch may be satisfied when an absolute value of a difference between a speed of the engine and a speed of a driving motor is less than a predetermined value.

The method may further include not connecting a speed gear corresponding to a next gear stage to the output shaft corresponding to the next gear stage in the state in which the engine is stopped.

The connecting the speed gear corresponding to the target gear stage to the output shaft corresponding to the target gear stage when the kick-down shift condition is satisfied may be performed while a state of the engine clutch is changed from a release state to a lock-up state.

An apparatus for controlling a hybrid electric vehicle according to an exemplary form of the present disclosure may include: an engine clutch disposed between an engine and a driving motor; a dual clutch transmission including two shift clutches and a gear train; a data detector detecting data for controlling the hybrid electric vehicle; and a controller controlling the engine clutch and the dual clutch transmission based on the data, wherein the controller may determine whether an engine start condition is satisfied in a state in which an engine is stopped, may determine whether a kick-down shift condition is satisfied when the engine start condition is satisfied, may connect a speed gear corresponding to a target gear stage to an output shaft corresponding to the target gear stage when the kick-down shift condition is satisfied, may determine whether a lock-up condition of the engine clutch is satisfied when the engine start condition is satisfied, may lock up the engine clutch when the lock-up condition of the engine clutch is satisfied, and may lock up a shift clutch corresponding to the target gear stage when the engine clutch is locked up.

The controller may determine whether the kick-down condition is satisfied based on a position value of an accelerator pedal, a speed of the hybrid electric vehicle, and a current gear stage.

The lock-up condition of the engine clutch may be satisfied when an absolute value of a difference between a speed of the engine and a speed of the driving motor is less than a predetermined value.

The controller may not connect a speed gear corresponding to a next gear stage to the output shaft corresponding to the next gear stage in the state in which the engine is stopped.

The controller may connect the speed gear corresponding to the target gear stage to the output shaft corresponding to the target gear stage while a state of the engine clutch is changed from a release state to a lock-up state.

According to an exemplary form of the present disclosure, when the engine start condition and the kick-down shift condition are satisfied, the speed gear corresponding to the target gear stage is connected to the output shaft corresponding to the target gear stage while the state of the engine clutch is changed from the release state to the lock-up state, thereby improving responsiveness and fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a flowchart of a method for controlling a hybrid electric vehicle.

DESCRIPTION OF SYMBOLS

Figure 1:
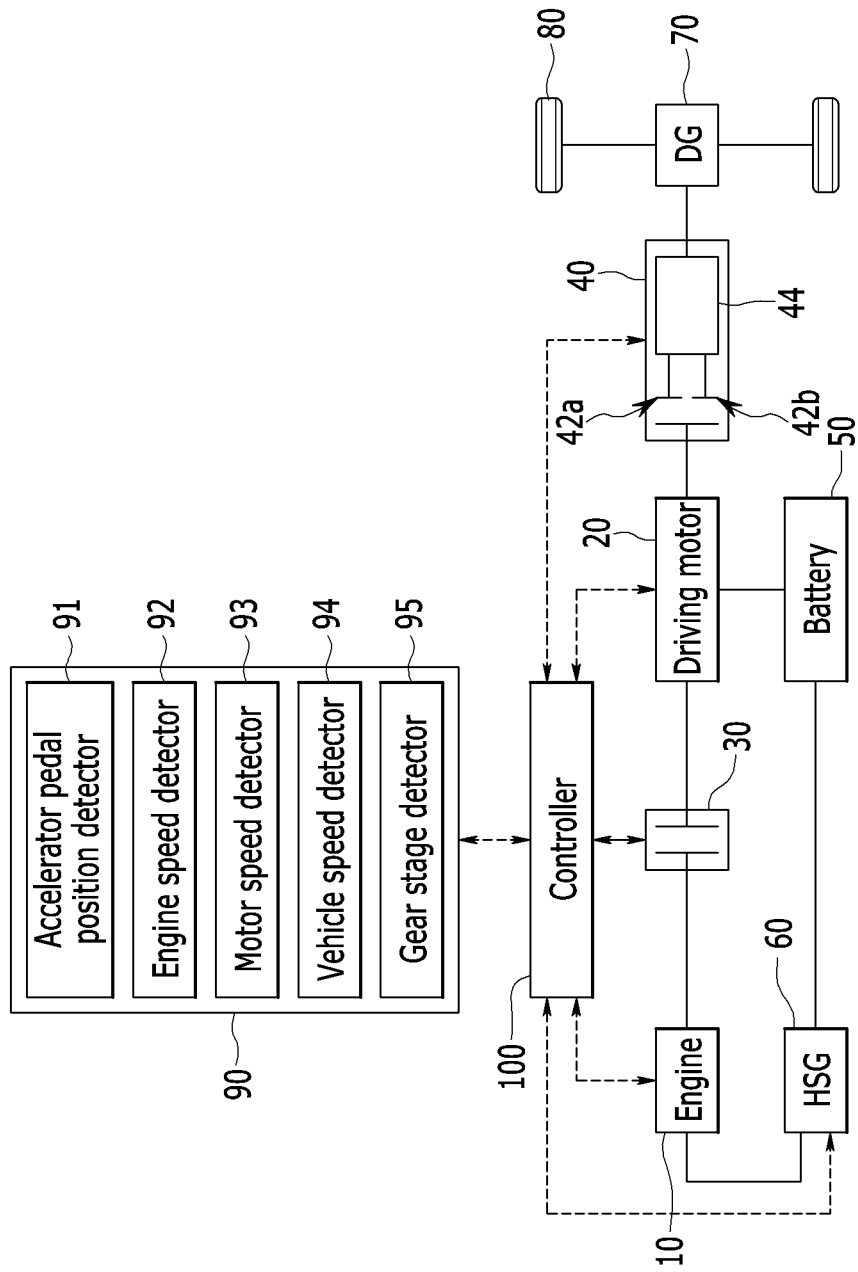
FIG. 1 is a diagram of a hybrid electric vehicle.

10: engine
20: driving motor
30: engine clutch
40: dual clutch transmission
50: battery
60: HSG
70: differential gear device
80: wheel
90: data detector
100: controller The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, each configuration illustrated in the drawings is arbitrarily shown for better understanding and ease of description, but the present disclosure is not limited thereto.

Figure 2:
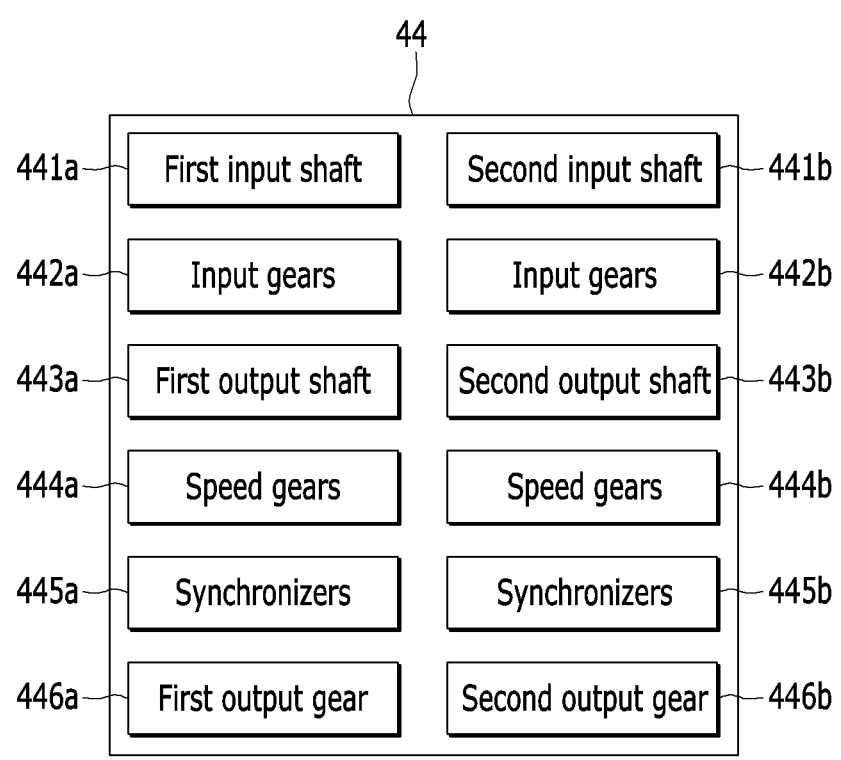
FIG. 2 is a block diagram of a gear train of a dual clutch transmission.

FIG. 1 is a diagram of a hybrid electric vehicle according to one form of the present disclosure, and FIG. 2 is a block diagram of a gear train of a dual clutch transmission according to the present disclosure.

As shown in FIG. 1, a hybrid electric vehicle includes an engine 10, a driving motor 20, an engine clutch 30 selectively connecting the engine 10 and the driving motor 20, a dual clutch transmission (DCT) 40, a battery 50, a hybrid starter & generator (HSG) 60, a differential gear device 70, a wheel 80, a data detector 90, and a controller 100.

The engine 10 combusts a fuel to generate torque, and various engines such as a gasoline engine, a diesel engine, and a liquefied petroleum injection (LPI) engine may be used as the engine 10.

For torque transmission of the hybrid electric vehicle, torque generated by the engine 10 and/or the driving motor 20 is transmitted to an input shaft of the DCT 40, and torque output from an output shaft of the DCT 40 is transmitted to an axle via the differential gear device 70. The axle rotates the wheel 80 such that the hybrid electric vehicle runs by the torque generated by the engine 10 and/or the driving motor 20.

The hybrid electric vehicle provides driving in an electric vehicle (EV) mode in which only torque of the driving motor 20 is used, a hybrid electric vehicle (HEV) mode in which torque of the engine 10 is used as main torque and torque of the driving motor 20 is used as auxiliary torque, and a regenerative braking mode in which braking and inertial energy are recovered through electrical power generation of the driving motor 20 during braking of the vehicle or during deceleration of the vehicle by inertia to be charged in the battery 50.

The battery 50 supplies electricity to the driving motor 20 in the EV mode and the HEV mode, and is charged with electricity recovered through the driving motor 20 in the regenerative braking mode.

The HSG 60 starts the engine 10 or generates electricity according to output of the engine. The HSG may refer to an integrated starter & generator (ISG).

The engine clutch 30 is disposed between the engine 10 and the driving motor 20. An input shaft of the engine clutch 30 is connected to the engine 10, and an output shaft of the engine clutch 30 is connected to the driving motor 20.

The DCT 40 includes two shift clutches 42a and 42b and a gear train 44. As shown in FIG. 2, the gear train 44 includes a first input shaft 441a, a second input shaft 441b, input gears 442a and 442b, a first output shaft 443a, a second output shaft 443b, speed gears 444a and 444b, synchronizers 445a and 445b, a first output gear 446a, and a second output gear 446b.

The first shift clutch 42a selectively transmits torque of the engine 10 and/or the driving motor 20 to the first input shaft 441a, and the second shift clutch 42b selectively transmits torque of the engine 10 and/or the driving motor 20 to the second input shaft 441b. The input gears 442a are fixedly disposed on the first input shaft 441a to achieve odd-numbered gear stages. The input gears 442b are fixedly disposed on the second input shaft 441b to achieve even-numbered gear stages. The speed gears 444a are rotatably disposed on the first output shaft 443a, and the speed gears 444b are rotatably disposed on the second output shaft 443b.

The synchronizers 445a selectively connect the speed gears 444a to the first output shaft 443a, and the synchronizers 445b selectively connect the speed gears 444b to the second output shaft 443b. The first output gears 446a are fixedly disposed on the first output shaft 443a and transmit torque of the first output shaft 443a to the differential gear device 70. The second output gears 446b are fixedly disposed on the second output shaft 443b and transmit torque of the second output shaft 443b to the differential gear device 70. Since the configuration of the DCT 40 is well known in the art, a detailed description thereof will be omitted in the present specification. The present disclosure is applied to any dual clutch transmission.

The data detector 90 detects data for controlling the hybrid electric vehicle, and the data detected by the data detector 90 is transmitted to the controller 100.

The data detector 90 may include an accelerator pedal position detector 91, an engine speed detector 92, a motor speed detector 93, a vehicle speed detector 94, and a gear stage detector 95. The data detector 90 may further include other detectors (e.g., a brake pedal position detector and so on).

The accelerator pedal position detector 91 detects a position value of an accelerator pedal (i.e., a pushed degree of the accelerator pedal), and transmits a signal corresponding thereto to the controller 100. When the accelerator pedal is pushed fully, the position value of the accelerator pedal is 100%, and when the accelerator pedal is not pushed, the position value of the accelerator pedal is 0%.

The engine speed detector 92 detects a speed of the engine 10 and transmits a signal corresponding thereto to the controller 100.

The motor speed detector 93 detects a speed of the driving motor 10 and transmits a signal corresponding thereto to the controller 100.

The vehicle speed detector 94 detects a speed of the hybrid electric vehicle and transmits a signal corresponding thereto to the controller 100.

The gear stage detector 95 detects a gear stage that is currently engaged and transmits a signal corresponding thereto to the controller 100. For example, gear stages which may be engaged may be first, second, third, fourth, fifth, sixth, and seventh gear stages, and a reverse stage, in a seven-speed transmission.

The controller 100 controls switching between the EV mode and the HEV mode based on driving conditions of the hybrid electric vehicle. In addition, the controller 100 controls the engine 10, the driving motor 20, the DCT 40, and the HSG 60 based on the data detected by the data detector 90. Further, the controller 100 determines a target gear stage and controls shifting from a current gear stage to the target gear stage. The controller 100 may be implemented with one or more processors executed by a predetermined program. The predetermined program may include a series of commands for performing each step included in a method for controlling a hybrid electric vehicle according to one form of the present disclosure to be described below.

Hereinafter, a method for controlling a hybrid electric vehicle will be described in detail with reference to FIG. 3.

FIG. 3 is a flowchart of a method for controlling a hybrid electric vehicle according to one form of the present disclosure.

As shown in FIG. 3, a method for controlling a hybrid electric vehicle is performed when the hybrid electric vehicle runs in the EV mode at step S100. In other words, the engine 10 is in a stopped state and the engine clutch is in a release state.

Hereinafter, the second gear stage will be exemplified as a current gear stage, and the second shift clutch 42b, the second input shaft 441b, the second output shaft 443b, and the speed gear 444b will be exemplified as a shift clutch, an input shaft, an output shaft, and a speed gear that correspond to the current gear stage, respectively.

The second shift clutch 42b corresponding to the current gear stage is in a lock-up state (a state in which the second shift clutch 42b is completely engaged) in the EV mode. In the EV mode, the controller 100 does not connect a speed gear 444a corresponding to a next gear stage (the first gear stage or the third gear stage) to the first output shaft 443a corresponding to the next gear stage. In other words, pre-selection (pre-engagement) is prohibited in the EV mode, thereby reducing drag loss of the DCT 40 and improving fuel efficiency of the hybrid electric vehicle.

The controller 100 determines whether an engine start condition is satisfied in a state in which the engine 10 is stopped at step S110. The engine start condition may include a condition requiring switching from the EV mode to the HEV mode. The engine start condition may be set by taking the position value of the accelerator pedal and the speed of the hybrid electric vehicle into consideration. For example, the controller 100 may calculate a demand torque of a driver based on the position value of the accelerator pedal and the speed of the hybrid electric vehicle, and the engine start condition may be satisfied when the demand torque of the driver is greater than or equal to a predetermined torque.

When the engine start condition is not satisfied at step S110, the controller 100 may return to step S100. In other words, the engine 10 maintains the stopped state.

When the engine start condition is satisfied at step S110, the controller 100 starts the engine 10 at step S120. In this case, the controller 100 may perform an engine cranking operation by driving the HSG 60 such that the speed of the engine 10 is increased. After that, the controller 100 generates torque of the engine 10 using combustion of the fuel.

When the engine start condition is satisfied, the controller 100 determines whether a kick-down shift condition is satisfied at step S130. In other words, the controller 100 determines whether down-shifting is required from the current gear stage to the target gear stage. The controller 100 may determine whether the kick-down shift condition is satisfied by using a shift pattern map based on the position value of the accelerator pedal, the speed of the hybrid electric vehicle, and the current gear stage. For example, when the accelerator pedal is rapidly pushed by the driver, the down-shifting may be performed to satisfy the demand torque of the driver.

When the kick-down shift condition is not satisfied at step S130, the controller 100 finishes the method for controlling the hybrid electric vehicle. In other words, kick-down shifting is not performed.

When the kick-down shift condition is satisfied at step S130, the controller 100 connects the speed gear 444a corresponding to the target gear stage to the first output shaft 443a corresponding to the target gear stage, and stands by so as to lock up the first shift clutch 42a corresponding to the target gear stage at step S140. In other words, while a state of the engine clutch 30 is changed from the release state to a lock-up state, the controller 100 may perform the pre-selection.

When the engine start condition is satisfied, the controller 100 determines whether a lock-up condition of the engine clutch 30 is satisfied at step S150. The lock-up condition of the engine clutch 30 may be satisfied when an absolute value of a difference between the speed of the engine 10 and the speed of the driving motor 20 is less than a predetermined value. The lock-up condition of the engine clutch 30 may be satisfied when a following Equation 1 is satisfied.

$$|W_{Engine} - W_{Motor}| < W_1$$ [Equation 1]

Herein, $W_{Engine}$ is the speed of the engine 10, $W_{Motor}$ is the speed of the driving motor 20, and $W_1$ is the predetermined value. In other words, the lock-up condition of the engine clutch 30 may be satisfied when the speed of the engine 10 is synchronized to the speed of the driving motor 20. The predetermined value may be set by taking heat capacity of the engine clutch 30 into consideration.

Steps S130 to S150 may be simultaneously performed, or may be separately performed regardless of the sequence.

When the lock-up condition of the engine clutch 30 is not satisfied at step S150, the controller 100 may return to step S140. In other words, the controller 100 continuously stands by so as to lock up the first shift clutch 42a corresponding to the target gear stage.

When the lock-up condition of the engine clutch 30 is satisfied at step S150, the controller 100 locks up the engine clutch 30 at step S160. When the engine clutch 30 is locked up, torque of the engine 10 may be transmitted to the DCT 40.

When the engine clutch 30 is locked up, the controller 100 locks up the first shift clutch 42a corresponding to the target gear stage at step S170. When the first shift clutch 42a corresponding to the target gear stage is locked up, the shifting to the target gear stage is achieved. After that, the controller 100 may control the engine 10 and/or the driving motor 20 to satisfy the demand torque of the driver.

As described above, according to one form of the present disclosure, when the engine start condition and the kick-down shift condition are satisfied, the speed gear corresponding to the target gear stage is connected to the output shaft corresponding to the target gear stage while the state of the engine clutch 30 is changed from the release state to the lock-up state, thereby improving responsiveness and fuel efficiency.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A method for controlling a hybrid electric vehicle including a dual clutch transmission, comprising:
    determining whether an engine start condition is satisfied in a state in which an engine is stopped;
    determining whether a kick-down shift condition is satisfied when the engine start condition is satisfied;
    connecting a speed gear corresponding to a target gear stage to an output shaft corresponding to the target gear stage when the kick-down shift condition is satisfied;
    determining whether a lock-up condition of an engine clutch is satisfied when the engine start condition is satisfied;
    locking up the engine clutch when the lock-up condition of the engine clutch is satisfied; and
    locking up a shift clutch corresponding to the target gear stage when the engine clutch is locked up.

2. The method of claim 1, wherein whether the kick-down shift condition is satisfied is determined based on a position value of an accelerator pedal, a speed of the hybrid electric vehicle, and a current gear stage.

3. The method of claim 1, wherein the lock-up condition of the engine clutch is satisfied when an absolute value of a difference between a speed of the engine and a speed of a driving motor is less than a predetermined value.

4. The method of claim 1, further comprising not connecting a speed gear corresponding to a next gear stage to the output shaft corresponding to the next gear stage in the state in which the engine is stopped.

5. The method of claim 1, wherein the connecting the speed gear corresponding to the target gear stage to the output shaft corresponding to the target gear stage when the kick-down shift condition is satisfied is performed
    while a state of the engine clutch is changed from a release state to a lock-up state.

6. An apparatus for controlling a hybrid electric vehicle, comprising:
    an engine clutch disposed between an engine and a driving motor;
    a dual clutch transmission including two shift clutches and a gear train;
    a data detector configured to detect data for controlling the hybrid electric vehicle; and
    a controller configured to control the engine clutch and the dual clutch transmission based on the data,
    wherein the controller determines whether an engine start condition is satisfied in a state in which an engine is stopped,
    determines whether a kick-down shift condition is satisfied when the engine start condition is satisfied,
    connects a speed gear corresponding to a target gear stage to an output shaft corresponding to the target gear stage when the kick-down shift condition is satisfied,
    determines whether a lock-up condition of the engine clutch is satisfied when the engine start condition is satisfied,
    locks up the engine clutch when the lock-up condition of the engine clutch is satisfied, and
    locks up a shift clutch corresponding to the target gear stage when the engine clutch is locked up.

7. The apparatus of claim 6, wherein the controller determines whether the kick-down condition is satisfied based on a position value of an accelerator pedal, a speed of the hybrid electric vehicle, and a current gear stage.

8. The apparatus of claim 6, wherein the lock-up condition of the engine clutch is satisfied when an absolute value of a difference between a speed of the engine and a speed of the driving motor is less than a predetermined value.

9. The apparatus of claim 6, wherein the controller does not connect a speed gear corresponding to a next gear stage to the output shaft corresponding to the next gear stage in the state in which the engine is stopped.

10. The apparatus of claim 6, wherein the controller connects the speed gear corresponding to the target gear stage to the output shaft corresponding to the target gear stage while a state of the engine clutch is changed from a release state to a lock-up state.

* * * * *